US008213139B2

(12) United States Patent
Li

(10) Patent No.: US 8,213,139 B2
(45) Date of Patent: Jul. 3, 2012

(54) LEAKAGE CURRENT PROTECTION PLUG AND INTERRUPT PROTECTION PLUG CONTACT SPRING STRUCTURE

(75) Inventor: Hin Yeung Li, Hong Kong (CN)

(73) Assignee: Luen Ming Electric Works Company Limited, Hong Kong (CN)

( * ) Notice: Subject to any disclaimer, the term of this patent is extended or adjusted under 35 U.S.C. 154(b) by 321 days.

(21) Appl. No.: 12/558,057

(22) Filed: Sep. 11, 2009

(65) Prior Publication Data

US 2010/0067160 A1 Mar. 18, 2010

(30) Foreign Application Priority Data

Sep. 12, 2008 (CN) ...................... 2008 2 0147511 U
Dec. 5, 2008 (CN) ...................... 2008 2 0234820 U

(51) Int. Cl.
*H02H 3/16* (2006.01)

(52) U.S. Cl. ........................................... 361/42; 361/44

(58) Field of Classification Search .................. 361/115, 361/42–50
See application file for complete search history.

(56) References Cited

U.S. PATENT DOCUMENTS 5,644,464 A * 7/1997 Zhou ............................ 361/115
5,943,199 A * 8/1999 Aromin .......................... 361/42

FOREIGN PATENT DOCUMENTS

| | | | |
|---|---|---|---|
| CN | 2141609 | Y | 9/1993 |
| CN | 2184993 | Y | 12/1994 |
| CN | 2290930 | Y | 9/1998 |
| CN | 2571047 | Y | 9/2003 |
| CN | 2739833 | Y | 11/2005 |
| CN | 200950504 | Y | 9/2007 |
| JP | 10284184 | A | 10/1998 |

* cited by examiner

*Primary Examiner* — Danny Nguyen
(74) *Attorney, Agent, or Firm* — Winstead PC

(57) ABSTRACT

A leakage current protection plug includes a plug housing, a power supply cord, two copper legs embedded within the plug housing, a leakage current protection device composed of two main moving contacts. A reset button presses the moving contacts to contact the two copper legs, a winding assemble, an iron core, a circuit board assemble, an ZCT. Ends of moving contacts are arranged with contacts that conduct individually with the two copper legs upon coming into contact; the power supply cord, through the ZCT, is connected with the moving contacts; the output of the ZCT is connected with the input of the amplification circuit on the circuit board, while the output of the amplification circuit is connected with the winding assemble.

3 Claims, 4 Drawing Sheets

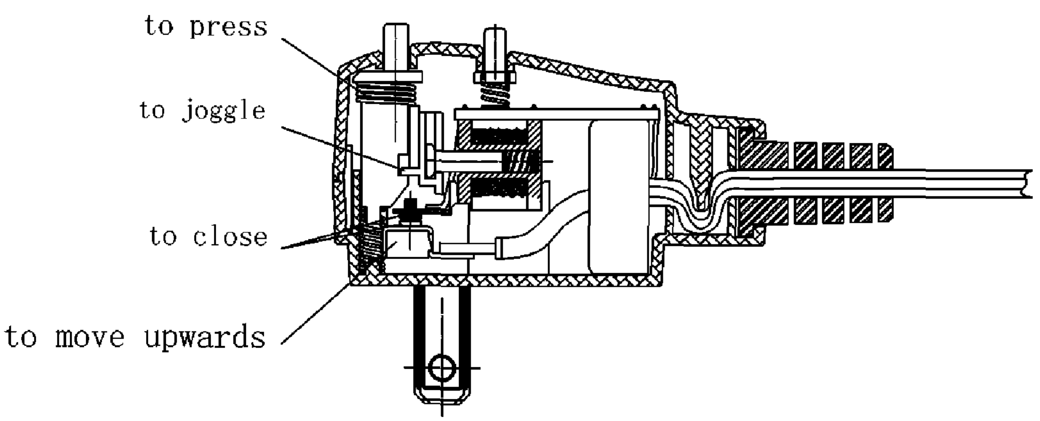
FIG 7 (Close-turn on)
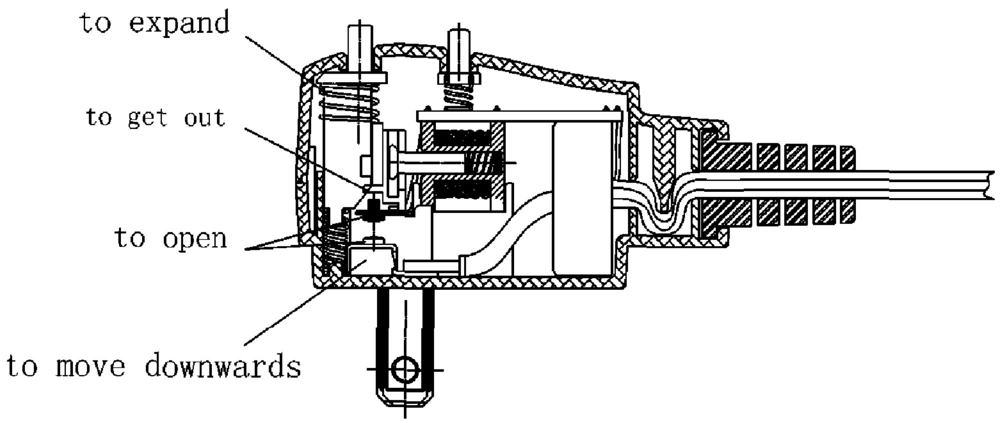
FIG 8 (Open-cut off)
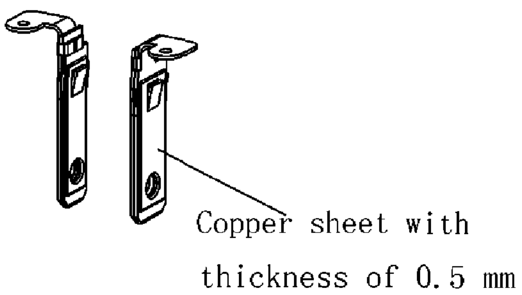
FIG 9 (Structure of the legs)

LEAKAGE CURRENT PROTECTION PLUG AND INTERRUPT PROTECTION PLUG CONTACT SPRING STRUCTURE

TECHNICAL FIELD

The present invention relates a power supply plug, in particular, a leakage current protection plug able to provide protection against leakage current. This invention further relates to a current interrupter protection plug contact spring structure whose contact applies a spring structure to enhance contact stability but to reduce resistance.

BACKGROUND ART

Nowadays, various appliances, especially, domestic appliances and office electrical apparatus, become more and more indispensable for our daily life. However, since these appliances usually work at a voltage that is prone to cause danger to people, thus a need to enhance protection against leakage current of the appliances gains particularly more and more concerns. The ordinary households though are equipped with leakage current interrupters which can provide protection against leakage current, these leakage current interrupters are usually disposed at the master switchboard of houses; a single room usually has a relatively high power consumption, thus the leakage current interrupters disposed at the master switchboard is usually set up with a much high safety current level, which thence cannot provide an ideal protection against leakage current. With consideration to such a concern, people begin to devise leakage current protection device applied on individual appliance for the sake of enhancing the interrupt protection once a leakage current occurs to an appliance; in the United States, it is enforced to add leakage current protection devices on some appliances, such as hair dryer and appliances used in bathroom, because these appliances are easily prone to danger for their application in the damp and wet environment. At present, the leakage current protection devices applicable for the appliances are, generally speaking, leakage current protection plugs; however, the common leakage current protection plugs in the market are usually made in complicated structures, whose producing process is noticeably complex. Namely, the leakage current protection plugs are necessarily subject to shortcomings of lower production, high cost, fragile structure and lower stability in performance.

Accordingly, it becomes fairly important to improve the interrupt protection ability of the appliances, in order to protect the appliances from safety concerns or accidents caused by short circuit, leakage current, plastic erosion or fire due to the high temperature of the plug in use. Therefore, a large number of appliances are equipped with interrupter capable of providing interrupt protection; since the leakage current protection plug provides a pretty well protection against leakage current, thus even if the external circuit lacks a leakage current protection device, the interrupt protection plug can also give good leakage current protection. Nowadays, the common interrupt protection plugs are all fabricated in a way of connecting a spring to the wire within the plug, so as to open the contact under the force of the spring. However, in the case the plug is applied to a interrupt device with great high current, the spring cantilever has to be fabricated much thicker so as to lower the temperature rise of the spring itself, but once the spring cantilever becomes thicker, the spring force of the spring cantilever will be affected tremendously. Consequently, the open-to-close durability of the spring cantilever becomes shorter under a bad spring force; accordingly, the durability of the plug will be affected too.

SUMMARY OF THE INVENTION

One object of the present invention is to provide a leakage current protection plug with merits of simple producing process, stable and reliable performance as well as lower cost.

The other object of the present invention is to provide an interrupt protection plug contact spring structure with more stable performance that maintains continuous spring force between the mutually contacted conductive contacts.

The leakage current protection plug of the invention, which is applicable for protecting appliances against leakage current danger, comprises a plug housing, a power supply cord, two copper legs embedded within the plug housing, a leakage current protection device, wherein the copper legs are connected to the socket housing fixedly at the front part of the socket; the leakage current protection device comprises two main moving arm, a reset button, a winding assemble, an iron core, a circuit board assemble and an ZCT; the ends of the two moving contacts are arranged with contacts that conduct respectively with the two copper legs upon their contact; the two moving contacts are disposed within the plug housing corresponding to the two copper legs and are connected with the power supply cord fixedly; the reset button is connected with the plug housing freely within the area defined by the plug housing; the reset button has a connection position and an open position respectively at the two ends of the sliding area, while one end of the reset button is arranged with a push-out spring for pressing the reset button at the open position under its spring force; the winding assemble is connected to the plug housing fixedly; the iron core, which is interposed into the hole of the winding assemble, coordinates with the winding assemble and meanwhile stands almost perpendicular to the reset button; a spring is arranged within the winding assemble hole for bouncing the iron core outwards, wherein a L plate is fabricated at the outer end of the iron core; both the circuit board assemble and the ZCT are embraced within the plug housing, while an amplification circuit is arranged on the circuit board assemble; the power supply cord, through the ZCT disposed at the lower end of the plug, is connected to the moving arms; the output of the ZCT is connected with the input of the amplification circuit on the circuit board assemble, while the output of the amplification circuit is connected with the winding assemble.

Once a leakage current occurs, the ZCT, upon sensing an unbalance current on the power supply cord, triggers the control circuits to drive the winding assemble, the iron core moves towards the hole within the winding assemble, the slot on the reset button gets out from the L plate of the iron core, and the moving contacts are separated from the copper legs; in this way, the appliance is well protected against the leakage current.

The leakage current protection plug further comprises a test switch device composed of a test switch spring and a test switch button; the spring hole at an end of the test switch spring is fixed to an inner end of the test switch button, wherein the test switch spring is a spiral conductive metal spring; the end of the test switch spring, which is fixed to the test switch button, forms the bottom end metal of the test switch spring and extends outwards to form a U-shape contact; the bottom end of the test switch spring comes into contact and bounces with the first conductive contact on the circuit board assemble correspondingly; the U-shape contact corresponds to the second conductive contact on the circuit board assemble; the first conductive contact and the second conductive contact are connected respectively to the L, N ends of the test circuit.

Once the test switch is pressed down, the U-shape protruded point comes into contact with another contact on the circuit board assemble, the resistors are connected at L, N ends via the test spring, and then the ZCT generates a leakage current to trigger the leakage current protection plug into operation.

Beneficial effects: the leakage current protection plug of the invention is in a simple structure because it makes the ZCT simplified and the winding assemble coordinately and controls the on and off of the power supply with a spring snap-latch mechanism, so that the cost for producing such a plug is also substantially reduced while the performance becomes more stable.

Besides, the interrupt protection plug contact spring structure of this invention, designed to control contact between the conductive contacts within the interrupt protection plug, is arranged within the housing of the interrupt protection plug and comprises legs connected in series with the plug wire, a current amplification module, a plug housing, a winding assemble, an iron core, a L plate, a fixed contact, a moving contact, a push-out spring, a press-in spring, a reset button and an actuator; wherein the moving contact and the fixed contact are made of conductive material, while the actuator is made of insulating material; the metallic legs are connected to the plug housing fixedly at the front part of the plug; a cylindrical hole is arranged at the center of the winding assemble that is connected to the plug housing fixedly within the plug housing; the bouncing spring is arranged within the cylindrical hole of winding assemble; the iron core is in a long cylindrical shape, while the upper end of the iron core, which is shaped as a long cylinder, protrudes outwards with a protruding rim; the iron core is arranged inside the cylindrical hole of the winding assemble, while the protruding rim of the iron core faces the outside of the cylindrical hole of the winding assemble; an end of the reset button is arranged with a push-out spring, the other end with a press-in spring; a slot is arranged at the almost central edge of reset button; a push-out spring is disposed to the end glove for the reset button, while a press-in spring with a relatively large diameter is disposed to the glove at the other end; the actuator is in a T-shape structure, wherein the lower end of the actuator is a forked end of the T-shape structure, and the upper end is a push-and-pull end; a guiding slot is mounted on the actuator, whose central portion is arranged with penetrated locating holes along the axis; the L plate is in a L shape, while the bending portion in L dovetail shape at the upper side of the L plate serves as the head; the L plate is arranged with a sliding slot along the axis at the side opposing to the head, and the sliding slot of the L plate slides to fit the protruding rim of the iron core; the head of the L plate goes through the locating hole on the actuator, whose guiding slot at upper side coordinates with the reset button for guiding a position; the slot on the actuator with head of the L plate for positioning; the push-out spring bounces the reset button outwards, while the press-in spring presses the push-and-pull end of the actuator, which also pushes the head of the L plate through the locating hole, so as to make the L plate move freely along the protruding rim of the iron core; the forked end of the actuator is connected with the moving contact fixedly, while the fixed contact is, between the moving contact and the iron core, connected with the plug housing fixedly and then contacted with the moving contact; the input of the current amplification module is connected in series with the plug, the winding assemble is connected to the amplification output of the current amplification module, and the two ends of the fixed contact and the moving contact are arranged in series in the circuit of the wire.

Further, the legs of the interrupt protection plug contact spring structure can be fabricated as folded hollow copper sheets with a thickness of 0.5 mm and exterior size of 1.5 mm; such a thin copper leg not only maintains enough pressing force between the leg and the socket, but also reduces the weight of the copper sheets so as to lower cost of the material.

Beneficial effects: in the case the interrupt protection plug contact spring structure of the invention is working, once the reset button outside the housing is pushed by a hand, the reset button moves downwards through overcoming the pressure from the push-out spring, then the slot of the reset button will engage with the L plate, then, the L plate comes into connection with the iron core and squeezes the bouncing spring till it comes into the slot of the reset button; meanwhile, the actuator and the reset button are positioned mutually stationary to each other; then the reset button is loosened, the actuators, together with the reset button, move upwards under the bouncing force from the push-out spring, so does the moving contact connected fixedly with the actuators, and then the moving contact comes into contact with the fixed contact, so that the circuit of the interrupt protection plug turns on entirely; once a break occurs, the winding assemble generates an instantaneous, relatively high magnetic attracting force, then the iron core moves inwards upon overcoming pressure from the bounce spring, while then the L plate within in the actuators gets out from the slot then moves downwards under the bouncing force from the press-in spring, which thus brings the moving contact apart from the fixed contact; in this way, the circuit is cut off so as to provide protection to the circuit once a break occurs. Further, in the case the power supply is on, the actuator would, under the spring force from the push-out spring, continuously produce proper bouncing force against the fixed contact, thus the interrupt protection plug contact spring structure can ensure sufficient tightness between the moving contact and the fixed contact, so that there is hardly any chance for ill contact because of gap coming up due to use for a long time. Additionally, it is not necessary to make the moving contact open under force of the spring itself, since the contacts are brought apart from each other under the spring force from the press-in spring, thus the moving contacts is set free from break and from inability to bounce back or the like caused due to fatigue of metal. Furthermore, the legs of the interrupt protection plug contact spring structure can be fabricated as folded hollow copper sheets with a thickness of 0.5 mm and exterior size of 1.5 mm, while such a design will not affect the closeness between the legs of said plug and the sockets as well as rigidity of the copper legs. Instead, along with reduction in consumption of the expensive copper materials, both the weight and cost of the legs are effectively lowered finally.

The invention is described hereby accompanied with the drawings so as to provide a clear, in-depth picture on the content and technique related to the present invention.

BRIEF DESCRIPTION OF THE DRAWINGS

FIGS. 7 and 8 show the operation of the interrupt protection plug contact spring structure according to the present invention; and FIG. 9 shows the details of the legs of the interrupt protection plug contact spring structure.

DETAILED DESCRIPTION OF ILLUSTRATIVE EMBODIMENTS OF THE INVENTION

Figure 1:
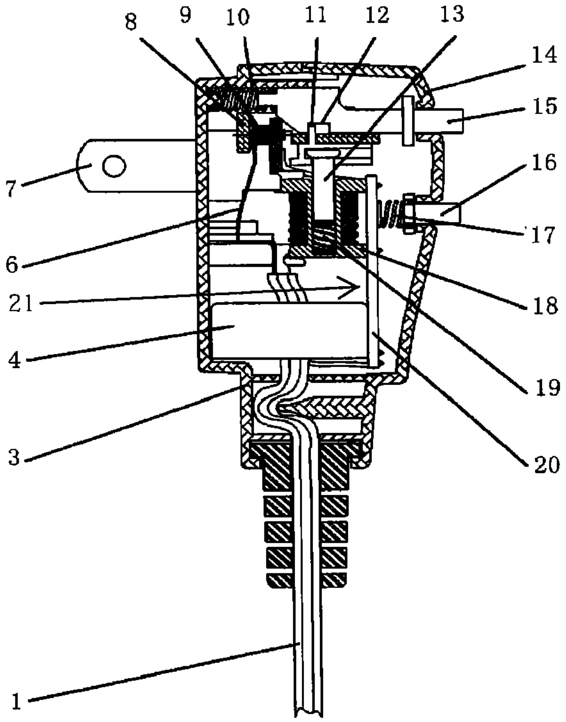
FIG. 1 shows a cutaway view for the leakage current protection plug according to the present invention.
Figure 2:
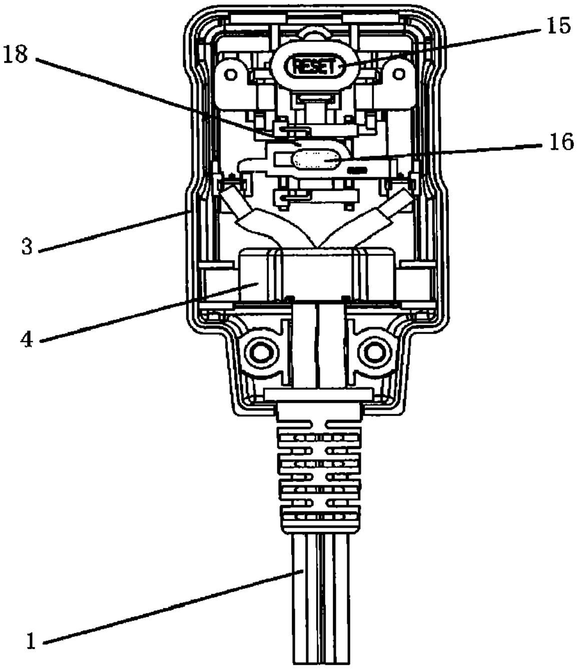
FIG. 2 shows a top view for the leakage current protection plug according to the present invention.

Turn to FIG. 1 and FIG. 2 that show the structural figures for a specific embodiment for the present invention. The leakage current protection plug of the invention, which is applicable for protecting appliances against leakage current danger, comprises a plug housing, a power supply cord 1, two copper legs 7 embedded within the plug housing, a leakage current protection device, wherein the copper legs 7 are connected to the socket housing fixedly at the front part of the socket; the leakage current protection device comprises two main moving arm 6, a reset button 15, a winding assemble 18, an iron core 13, a circuit board assemble 20 and an ZCT 4.

In this embodiment, the plug housing is composed of an upper housing 14 and a lower housing 3; the two main moving arm 6 are conductive metal reeds with good resilience, and the respective two moving arms 6 are arranged correspondingly and connected fixedly with the power supply cord 1, two copper legs 7 at an end within the inner area enclosed by the plug housing, while contact points 9 are arranged respectively at the other end of the main moving arms 6 for conducting with the two copper legs 7 upon their contacting; actuator 8 are arranged correspondingly on the two copper legs 7 for conducting with the two contact points 9 upon their contacting; the reset button 15, connected with the plug housing flexibly within the space defined by the plug housing, is allowed to slide freely within the certain sliding area and has a connection position and an open position individually at the two ends of the sliding area; while one end of the reset button 15 is arranged with a push-out spring 10 for pressing the reset button 15 at the open position; the winding assemble 18 is connected with the plug housing fixedly; the iron core 13, which is interposed within the hole of the winding assemble, coordinates with the winding assemble 18 and meanwhile stands almost perpendicular against the reset button 15; a spring 19 is arranged inside the hole of the winding assemble for bouncing the iron core 13 outwards, wherein a L plate 11 is arranged at the outer end of the iron core 13; both the circuit board assemble 20 and the ZCT 4 are embraced within the plug housing, while an amplification circuit 21 is arranged on the circuit board assemble 20; the power supply cord 1, through the ZCT 4 disposed at the lower end of the plug, is connected with the moving arm; the output of the ZCT 4 is connected to the input of the amplification circuit 21 on the circuit board assemble, while the output of the amplification circuit 21 is connected with the winding assemble 18; when the power supply is on, the reset button 15 overcomes the spring force from the main moving arm 6 so as to drive the two main moving arms 6 to come into contact with the two copper legs.

In a normal case, the push-out spring 10 maintains a spring pressure against the spring force by moving arm 6, and the L plate 11 at the outer end of the iron core 13 joggles mutually with the slot 12 on the reset button 15 that is located at the connection position; then the reset button 15 pushes the contact points 9 of the main moving arm 6 to come into contact with the copper legs 7, so that the circuits of the plug come into connection and then turn on; in case a leakage current happens to an appliance applied on this plug, a current with unbalance input and output would be generated on the cord 1, then the ZCT 4 generates an induced current, which, after being amplified by the amplification circuit 21, drives the winding assemble 18 into working, so that the winding assemble 18 sorbs the iron core 13, which thence moves towards the winding assemble hole; then, the slot 12 on the reset button 15 gets out from the L plate 11 of the iron core 13, thereby the push-out spring 10 presses the reset button 15 outwards from its former connection position to the open position, the main moving arm 6 are separated from the copper legs 7, so that the leakage current protection plug is cut off from the power supply, which thus provides protection to the appliance against the leakage current.

Figure 3:
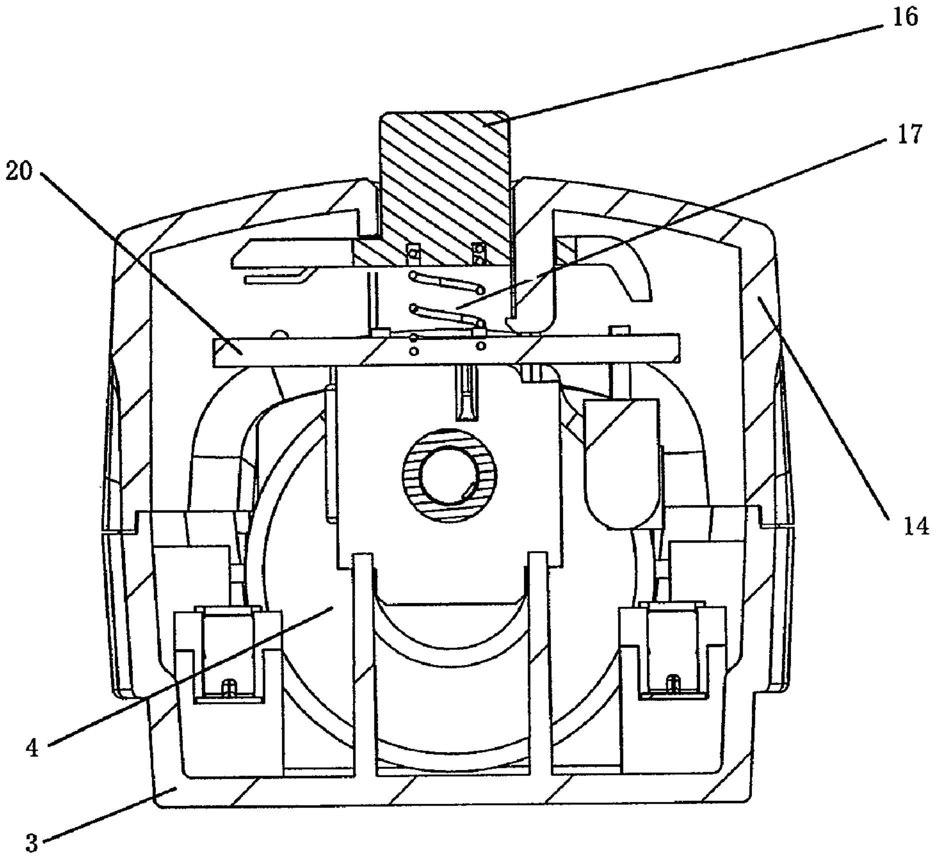
FIG. 3 is structural diagram showing the part of test switch of the leakage current protection plug according to the present invention.
Figure 4:
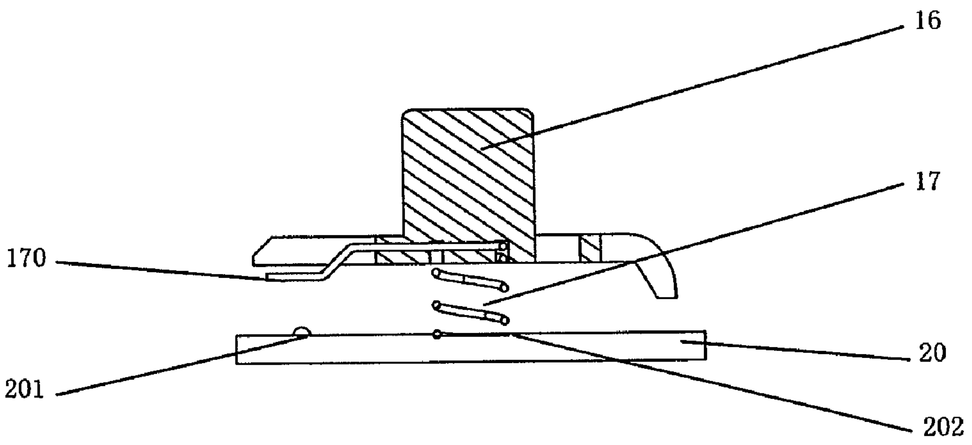
FIG. 4 is a diagram showing the connection between the test switch button and the test switch spring.

FIGS. 3-4 illustrate a structural diagram showing a part of test switch of a leakage current protection plug and a connection between a test switch button and a test switch spring, respectively. As shown in FIG. 3, the leakage current protection plug according to this invention further provides a test switch, so that the sensitivity of the leakage current protection plug can be accurately checked at any time. The leakage current protection plug further comprises a test switch device composed of a test switch spring 17 and a test switch button 16; the spring hole at an end of the test switch spring 17 is fixed to an inner end of the test switch button 16, wherein the test switch spring 17 is a spiral conductive metal spring; the end of the test switch spring 17, which is fixed to the test switch button 16, forms the bottom end metal of the test switch spring 17 and extends outwards to form a U-shape contact 170; the bottom end of the test switch spring 17 comes into contact and bounces with the first conductive contact 202 on the circuit board assemble 20 correspondingly; the U-shape contact 170 corresponds to the second conductive contact 201 on the circuit board assemble 20; the first conductive contact 202 and the second conductive contact 201 are connected respectively to the L, N ends of the test circuit. Usually, the L, N ends of the test switch are either open or are connected in series with a resistor at much high resistance (more than 10000 ohms). In the present embodiment, a test switch resistor at 15000 ohms is arranged between the L, N ends in series; when the switch is pressed down, the U-shape contact on the test switch spring comes into contact with the second contact on the circuit board, so that the test switch resistor is short circuited by the test spring; then the ZCT generates a signal to trigger the leakage current protection plug to serve its role. Nevertheless, when it is desirable to check the sensitivity of the leakage current protection plug, the leakage current test circuit will turn on upon the test switch button 16 being pressed down; then the ZCT 4 senses varied signals of the unbalance current, thereby makes the reset button 15 pops out from the connection position to the open position, the main moving arms 6 are then separated apart from the copper legs 7, so that the power supply is cut off; in this way, both sensitivity and effectiveness of the leakage current protection plug can be well checked. Once the pressure on the test switch button 16 goes away, the test switch button 16 is bounced out under the force from the test switch spring 17, in this way, the leakage current test circuit turns out; meanwhile, once the reset button 15 is pressed down again, it joggles again with the iron core 13 at the connection position, then the main moving arm 6 and the copper legs 7 also come into contact, thereby the leakage current protection plug resumes the leakage current protection state.

Figure 5:
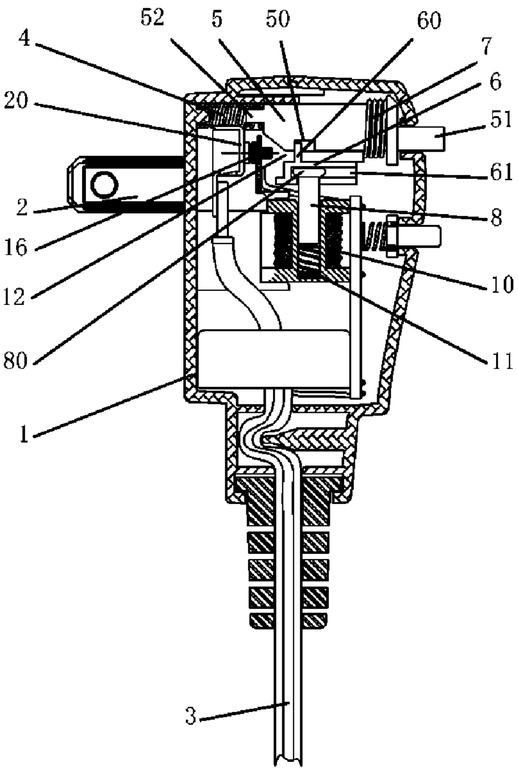
FIG. 5 shows a cutaway view where the moving contact and the fixed contact are closed upon their coming into contact according to the invention.
Figure 6:
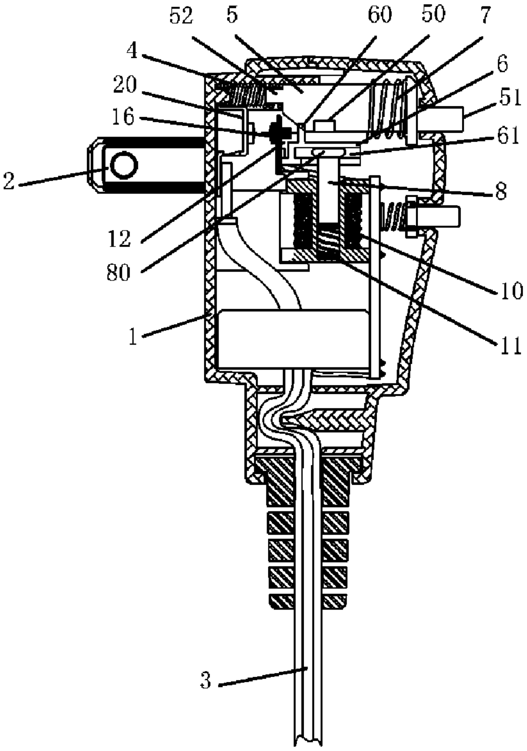
FIG. 6 shows a cutaway view where the moving contact and the fixed contact are open upon their separating according to the invention.

Now turn to FIG. 5 and FIG. 6 that show the structural view for a specific embodiment of the present invention. The interrupt protection plug contact spring structure of this invention, designed to control contact between the conductive contacts within the interrupt protection plug, is arranged within the housing of the interrupt protection plug and comprises legs connected in series with the plug wire, a current amplification module, a plug housing, a winding assemble, a iron core, a L plate, a fixed contact, a moving contact, a push-out spring, a press-in spring, a reset button and an actuator; wherein the moving contact and the fixed contact are made of conductive material, while the actuator is made of insulating material; the metallic legs are connected to the plug housing fixedly at the front part of the plug; a cylindrical hole is arranged at the center of the winding assemble that is connected to the plug housing fixedly within the plug housing; the bouncing spring is arranged within the cylindrical hole of winding assemble; the iron core is in a long cylindrical shape, while the upper end of the iron core, which is shaped as a long cylinder, protrudes outwards with a protruding rim; the iron core is arranged inside the cylindrical hole of the winding assemble, while the protruding rim of the iron core faces the outside of the cylindrical hole of the winding assemble; an end of the reset button is arranged with a push-out spring, the other end with a press-in spring; a slot is arranged at the almost central edge of reset button; a push-out spring is disposed to the end glove for the reset button, while a press-in spring with a relatively large diameter is disposed to the glove at the other end; the actuator is in a T-shape structure, wherein the lower end of the actuator is a forked end of the T-shape structure, and the upper end is a push-and-pull end; a guiding slot is mounted on the actuator, whose central portion is arranged with penetrated locating holes along the axis; the L plate is in a L shape, while the bending portion in L dovetail shape at the upper side of the L plate serves as the head; the L plate is arranged with a sliding slot along the axis at the side opposing to the head, and the sliding slot of the L plate slides to fit the protruding rim of the iron core; the head of the L plate goes through the locating hole on the actuator, whose guiding slot at upper side coordinates with the reset button for guiding a position; the slot on the actuator with head of the L plate for positioning; the push-out spring bounces the reset button outwards, while the press-in spring presses the push-and-pull end of the actuator, which also pushes the head of the L plate through the locating hole, so as to make the L plate move freely along the protruding rim of the iron core; the forked end of the actuator is connected with the moving contact fixedly, while the fixed contact is, between the moving contact and the iron core, connected with the plug housing fixedly and then contacted with the moving contact; the input of the current amplification module is connected in series with the plug, the winding assemble is connected to the amplification output of the current amplification module, and the two ends of the fixed contact and the moving contact are arranged in series in the circuit of the wire.

Further, the legs of the interrupt protection plug contact spring structure can be fabricated as folded hollow copper sheets with a thickness of 0.5 mm and exterior size of 1.5 mm; while such a design will not affect to the closeness between the legs of said plug and the socket as well as to the rigidity of the copper legs. Instead, along with reduction in consumption of the expensive copper materials, both the weight and cost of the legs are effectively lowered finally.

A leakage current protection plug, which is applicable for protecting appliances against leakage current danger and comprises a plug housing, a power supply cord, two copper legs embedded within the plug housing, a leakage current protection device composed of two main moving contacts, wherein the reset button, joggling with the slot in the iron core, presses the moving contacts to contact the two copper legs, a winding assemble, an iron core, a circuit board assemble, an ZCT; the ends of the two moving contacts are arranged with contacts that conduct individually with the two copper legs upon their coming into contact; the power supply cord, through the ZCT, is connected with the moving contacts; the output of the ZCT is connected with the input of the amplification circuit 21 on the circuit board, while the output of the amplification circuit 21 is connected with the winding assemble; once a leakage current occurs, the ZCT, upon sensing an unbalance current on the power supply cord, triggers the control circuits to drive the winding assemble, the iron core moves towards the hole within the winding assemble, the slot on the reset button gets out from the L plate of the iron core, and the moving contacts are separated from the copper legs; in this way, the appliance is well protected against the leakage current. Also, this invention further provides an interrupt protection plug contact spring structure.

What is claimed is:

1. A leakage current protection plug comprising:
- a plug housing;
- a power supply cord;
- two copper legs embedded within the plug housing;
- a leakage current protection device;
- wherein the two copper legs are connected to a socket housing fixedly at a front part of a socket;
- wherein the leakage current protection device comprises two main moving contacts, a reset button, a winding assemble, an iron core, a circuit board, a ZCT (Zero Current Transformer), and a test switch device;
- wherein ends of the two main moving contacts are arranged to conduct respectively with the two copper legs upon contact between the two main moving contacts and the two copper legs;
- wherein the two main moving contacts are disposed within the plug housing corresponding to the two copper legs and are connected with the power supply cord fixedly;
- wherein the reset button is connected with the plug housing freely within an area defined by the plug housing;
- wherein the reset button has a connection position and an open position respectively at two ends of a sliding area;
- wherein a first end of the reset button is arranged with a push-out spring for pressing the reset button at the open position under a spring force;
- wherein the winding assemble is fixedly connected to the plug housing;
- wherein the iron core is interposed into a winding assemble hole, coordinates with the winding assemble, and stands generally perpendicular to the reset button;
- wherein a spring is arranged within the winding assemble hole for bouncing the iron core outwards;
- wherein a L plate is fabricated at an outer end of the iron core;
- wherein the circuit board and the ZCT are embraced within the plug housing;
- wherein an amplification circuit is arranged on the circuit board;
- wherein the power supply cord is connected to the two main moving contacts through the ZCT disposed at a lower end of the plug housing;

wherein an output of the ZCT is connected with an input of the amplification circuit on the circuit board;

wherein an output of the amplification circuit is connected with the winding assemble;

wherein the test switch device comprises a test switch spring and a test switch button;

wherein a first end of the test switch spring is fixed to an end of the test switch button;

wherein the test switch spring is a spiral conductive metal spring;

wherein the first end of the test switch spring, fixed to the end of the test switch button, forms a bottom end metal of the test switch spring and extends outwards to form a U-shape contact;

wherein the bottom end metal of the test switch spring comes into contact and bounces with a first conductive contact on the circuit board correspondingly;

wherein the U-shape contact corresponds to a second conductive contact on the circuit board; and wherein the first conductive contact and the second conductive contact are connected respectively to an L end and an N end of a test circuit.

2. An interrupt protection plug contact spring structure, arranged within a housing of an interrupt protection plug for control contact between conductive contacts within the interrupt protection plug, wherein:

the interrupt protection plug contact spring structure, designed to control contact between the conductive contacts within the interrupt protection plug, is arranged within the housing of the interrupt protection plug and comprises legs connected in series with a plug wire, a current amplification module, a plug housing, a winding assemble, an iron core, a L plate, a fixed contact, a moving contact, a push-out spring, a press-in spring, a reset button, and an actuator;

the moving contact and the fixed contact are made of a conductive material, while the actuator is made of an insulating material;

the legs are connected to the plug housing fixedly at a front part of a plug;

a cylindrical hole is arranged at a center of the winding assemble that is connected to the plug housing fixedly within the plug housing;

the bouncing spring is arranged within the cylindrical hole of the winding assemble;

the iron core is in a long cylindrical shape, while an upper end of the iron core, which is shaped as a long cylinder, protrudes outwards with a protruding rim;

the iron core is arranged inside the cylindrical hole of the winding assemble, while the protruding rim of the iron core faces an outside of the cylindrical hole of the winding assemble;

a first end of the reset button is arranged with the push-out spring, a second end of the reset button is arranged with the press-in spring;

a slot is arranged at an almost central edge of the reset button;

the push-out spring is disposed to an end glove for the reset button, while the press-in spring, with a relatively large diameter, is disposed to the glove at the second end;

the actuator is in a T-shape structure, wherein a lower end of the actuator is a forked end of the T-shape structure, and an upper end is a push-and-pull end;

a guiding slot is mounted on the actuator, whose central portion is arranged with penetrated locating holes along the axis;

the L plate is in a L shape, while a bending portion in a L dovetail shape at an upper side of the L plate serves as the head;

the L plate is arranged with a sliding slot along an axis at a side opposing to the head, and the sliding slot of the L plate slides to fit the protruding rim of the iron core;

the head of the L plate goes through a locating hole on the actuator, whose guiding slot on an upper side coordinates with the reset button for guiding a position the slot on the actuator with head of the L plate for positioning;

the push-out spring bounces the reset button outwards, while the press-in spring presses the push-and-pull end of the actuator, which also pushes the head of the L plate through the locating hole, so as to make the L plate move freely along the protruding rim of the iron core;

the forked end of the actuator is connected with the moving contact fixedly, while the fixed contact is, between the moving contact and the iron core, connected with the plug housing fixedly and then contacted with the moving contact; and an input of the current amplification module is connected in series with the plug, the winding assemble is connected to the amplification output of the current amplification module, and the two ends of the fixed contact and the moving contact are arranged in series.

3. The interrupt protection plug contact spring structure according to claim 2, wherein the legs thereof are folded hollow copper sheets with a thickness of 0.5 mm and exterior size of 1.5 mm.

* * * * *